US007509587B2

(12) United States Patent
Kopitzke et al.

(10) Patent No.: US 7,509,587 B2
(45) Date of Patent: *Mar. 24, 2009

(54) USER INTERFACE, SYSTEM AND COMPUTER PRODUCT FOR MONITORING AIRCRAFT CABIN SYSTEMS

(75) Inventors: Kirsten Kopitzke, Hamburg (DE); Martin Frey, Hamburg (DE); Joerg Holst, Wulmstorf (DE); Christian Riedel, Bliedersdorf (DE)

(73) Assignee: Airbus Deutschland GmbH, Hamburg (DE)

( * ) Notice: Subject to any disclaimer, the term of this patent is extended or adjusted under 35 U.S.C. 154(b) by 903 days.

This patent is subject to a terminal disclaimer.

(21) Appl. No.: 10/713,223

(22) Filed: Nov. 17, 2003

(65) Prior Publication Data

US 2004/0145612 A1    Jul. 29, 2004

Related U.S. Application Data

(63) Continuation of application No. 09/871,032, filed on May 31, 2001, now Pat. No. 6,988,246.

(30) Foreign Application Priority Data

May 31, 2000   (DE)   .................................. 100 26 788
Jan. 4, 2001   (DE)   .................................. 101 00 273

(51) Int. Cl.
   *G06F 3/048*   (2006.01)
   *G06F 3/00*    (2006.01)
(52) U.S. Cl. ......................... 715/810; 715/970; 700/277
(58) Field of Classification Search ................. 715/702, 715/810, 970, 830; 700/276, 277, 210; 244/118.5; 340/945
See application file for complete search history.

(56) References Cited

U.S. PATENT DOCUMENTS

| 5,086,385 | A  | * | 2/1992  | Launey et al. ................. 700/83  |
| 5,555,502 | A  | * | 9/1996  | Opel ........................... 701/36  |
| 5,677,603 | A  | * | 10/1997 | Speirs et al. ................ 315/324  |
| 6,346,892 | B1 | * | 2/2002  | DeMers et al. .............. 340/945    |
| 6,424,337 | B1 | * | 7/2002  | Eriksson et al. ............. 345/163   |
| 2002/0015063 | A1 |   | 2/2002  | Kopitzke et al.                        |
| 2002/0016639 | A1 | * | 2/2002  | Smith et al. ................... 700/9  |

OTHER PUBLICATIONS

Elo Graphics, "History of Elo", from http://www.elotouch.com/AboutElo/History/default.asp.*

* cited by examiner

*Primary Examiner*—Dennis G. Bonshock
(74) *Attorney, Agent, or Firm*—Oblon, Spivak, McClelland, Maier & Neustadt, P.C.

(57) ABSTRACT

A user interface for monitoring and controlling a plurality of aircraft cabin systems includes a liquid crystal display screen (LCD) having a touch sensitive input surface including a plurality of touch sensitive input keys. Each key is labeled with a symbol identifying a respective one of the plurality of aircraft cabin systems. First and second system menus corresponding to first and second systems of the plurality of aircraft cabin systems are displayable on the LCD as first and second system graphical menus when a key identifying the appropriate system is activated by the user. The graphical menus include status information and operating functions as well as an input area that provides selection and control of the operating functions of the respective system when touched by the user.

22 Claims, 9 Drawing Sheets

USER INTERFACE, SYSTEM AND COMPUTER PRODUCT FOR MONITORING AIRCRAFT CABIN SYSTEMS

CROSS REFERENCE TO RELATED APPLICATIONS

This application is based on and claims priority to U.S. patent application Ser. No. 09/871,032 filed May 31, 2001, which claims priority to German Patent Application No. 10026788.2, filed May 31, 2000, and German Patent Application No. 10100273.4, filed Jan. 4, 2001. The entire content of each of these applications is incorporated herein by reference.

BACKGROUND OF THE INVENTION

1. Field of the Invention

The invention relates to an apparatus for controlling and monitoring aircraft cabin systems, for example the functions of the information, audio, video, lighting, door, water supply, or wastewater systems, and further relates to a method for operating the apparatus.

2. Discussion of the Background

The operation and status of present day aircraft cabin systems are typically controlled and monitored from operating devices having simple input key panels and relatively small liquid crystal displays. With such operating devices, the functionality of the display and of the input keys is quite limited, or even strictly fixed to a respective single assigned function. In other words, there is little or no flexibility or adaptability of the present day conventional operating devices to accommodate changes of the respective cabin systems that are to be controlled or monitored. Therefore, the technical possibilities with regard to the expansion, flexibility, and adaptation to the most modern technologies are completely exhausted. There is a need to provide a more versatile, adaptable, user-friendly, and intuitively operable device for monitoring and controlling aircraft cabin systems.

SUMMARY OF THE INVENTION

In view of the above, it is an object of the invention to provide a device or arrangement of the above mentioned general type, which can be adapted to various prescribed requirements existing in any given application, for controlling and monitoring a variety of aircraft cabin systems from a single compact input and display arrangement. It is another object of the invention to provide a method for operating such a control and monitoring arrangement, which is user-friendly, intuitive, adaptable and reprogrammable to accommodate variations of the systems to be controlled and monitored. The invention further aims to avoid or overcome the disadvantages of the prior art, and to achieve additional advantages, as apparent from the present specification.

The above objects have been achieved according to the invention in a flight attendant operating device in the form of an input and display arrangement or interface panel comprising a liquid crystal display screen and a touch sensitive surface input arrangement. The liquid crystal display screen comprises a basic layout including a general display area as well as touch sensitive input keys embodied or provided with respective system and function symbols respectively associated with these input keys. The symbols may be words, letters, graphical icons, or any other identifying indicia. At least two system menus, which are respectively associated with two respective cabin systems, are provided as subordinate to the basic layout and can be displayed selectively on the general display area of the basic layout for selecting, controlling and monitoring the functions of the respective associated cabin system. As such, the respective individual system menus each operate as a system-specific window that can be selectively brought up in the display area of the basic layout. The system menus are thus virtual menus that may include virtual display areas and/or virtual input areas, and that may be selectively brought up and displayed in the display area of the basic layout.

All of the various menus or other features that are to be displayed in the display area of the basic layout can be generated, selected, arranged, and manipulated in any conventionally known manner by means of appropriate software and/or hardware, operating in the context of a computer system, which may be the general aircraft computer system, or a portion thereof, or a separate cabin system control computer. In response to the user inputs received from the inventive device, the computer then sends corresponding control command signals to the respective cabin systems to effectuate the desired control functions in any known manner.

According to further detailed embodiments, the invention provides for a main menu that can be displayed on the display area of the basic layout and that indicates the cabin status, i.e. the status of various systems or components within the cabin. Thereby, the main menu is provided or hierarchically arranged between the basic layout and the system menus. The main menu displays the essential information regarding the various cabin systems so that one or more of the cabin systems may be selected from a menu page of the main menu. The invention further preferably provides that the basic layout additionally includes, across the top of the basic layout, a header line or bar that identifies the respective active menu.

The above objects have further been achieved according to the invention in a method of operating the above described arrangement, including the following steps:

an operator or user such as a flight attendant first touches or presses a desired system symbol on the basic layout or on the main menu so as to select and call up the respective associated main menu or subordinate system menu;

b) as a result, the selected main menu or system menu will be displayed on the general display area of the liquid crystal display screen; and c) the operator then touches or presses respective pertinent function symbols displayed on the selected main menu or system menu, whereby these function symbols are respectively associated with prescribed operating functions of the pertinent selected system, in order to thereby select and/or adjust the desired operating functions of the respective associated selected cabin system.

The invention thus provides an apparatus whereby the flight attendant operating device may advantageously be universally adapted to various different respective requirements, by making use of touch sensitive screen technology. In other words, the display area of the basic layout is embodied as a touch sensitive screen, and can have various menus or windows displayed selectively thereon. The input keys of any system menu are essentially virtual input keys that can be displayed as needed for the various subsystems in the display area of the basic layout. Respective touch sensitive areas of the touch sensitive screen respectively in registration with the virtual displayed input keys will receive the touch inputs of the user.

Thereby, any given portion or area of the basic layout is not strictly dedicated to a particular function, but instead the display and input functions can be variably indicated or arranged on the basic layout as needed. Moreover, a required change of the display and/or input functions to accommodate a change or difference in the respective aircraft cabin systems can be achieved by simply reprogramming the software that generates the various displays and input functions. Such universal adaptability is directly linked to the required flexibility. Furthermore, the inventive arrangement provides a single, compact, versatile operator interface that makes it possible to control and monitor all of the relevant aircraft cabin systems from this single compact unit.

The inventive operating device or operator interface provides the following advantages:
a) easy user recognition of known functions and processes or sequences;
b) intuitively correct user inputs without requiring specialized training;
c) the possibility of reallocation and reuse of the same individual elements such as input keys, symbols, display fields, etc. to various different systems and/or functions;
d) by using a color display screen, it becomes possible to maintain a consistent color scheme or philosophy, i.e. using the same colors universally in connection with the same purpose, condition, status, or result to be achieved;
e) the display properties of the device can be adjusted or adapted to maintain good visibility under varying lighting conditions within the aircraft cabin; and
f) use of the fewest possible submenu planes for achieving a relatively flat hierarchy of the sub-menus or sub-windows.

BRIEF DESCRIPTION OF THE DRAWINGS

In order that the invention may be clearly understood, it will now be described in connection with an example embodiment, with reference to the accompanying drawings, wherein.

DESCRIPTION OF THE PREFERRED EMBODIMENTS

Figure 1:
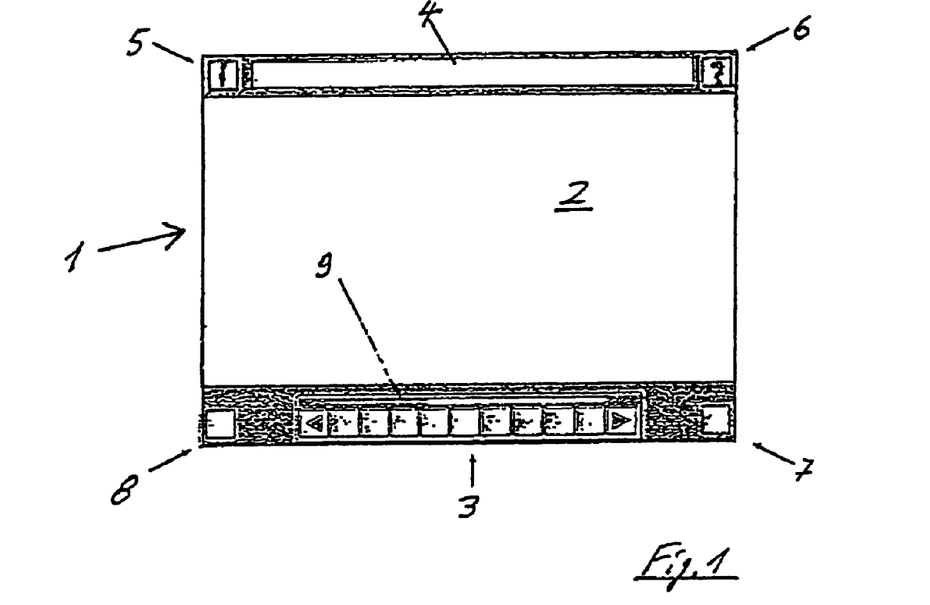
FIG. 1 schematically shows the basic layout of an operating device according to the invention, including a liquid crystal display screen and a touch sensitive surface input arrangement.

FIG. 1 schematically shows the basic layout 1 of the operator surface or user interface of a flight attendant operating device, comprising a liquid crystal display screen in combination with a touch sensitive surface input arrangement, for example embodied together as a touch sensitive screen. The basic layout 1 is preferably divided into three parts or areas. Namely, the basic layout 1 comprises a general display area 2, pressure sensitive or touch sensitive input keys 3 respectively provided with system and functional symbols, and a header line or bar 4 for identifying the respective active menu. The available menus, which can be selected and displayed individually or together in any conventionally known single window or multiple window format, include a main menu 10 (see FIG. 2) and at least two or more system menus 11 to 19 (see FIG. 2). The selected menu is respectively displayed on the general display area 2 of the basic layout 1.

Figure 2:
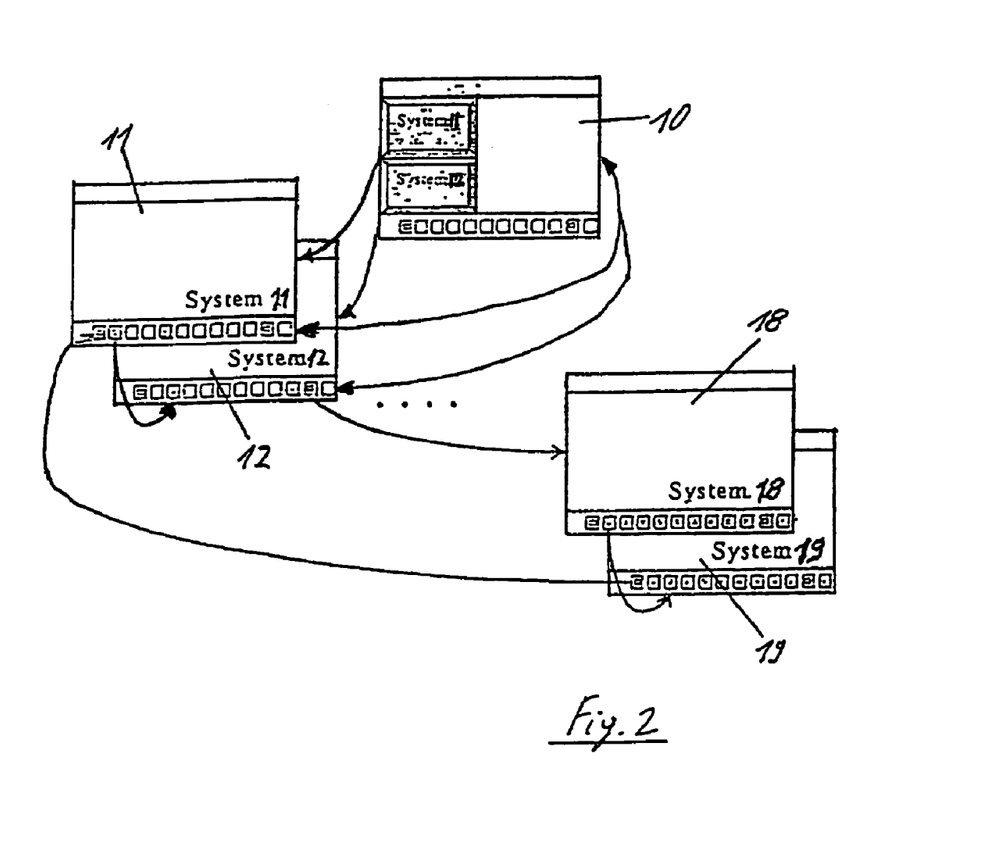
FIG. 2 is a schematic diagram representing the interrelationships of the menu structure of the main menu and several subordinate system menus.

The main menu 10 displays the cabin status and the respective essential information or data regarding the various cabin systems so that a respective desired one of the cabin systems can be selected on a menu page of the main menu 10, for example by simply touching the touch sensitive screen in an area corresponding to the display of the respective cabin system information or symbols, or by touching one of the touch input keys 3 that is associated with that system. Once a respective one of the cabin systems is selected, the respective associated system menu will be displayed on the general display area 2 of the basic layout 1. The several system menus 11 to 19 are each respectively adapted for selecting, controlling and monitoring the functions of the respective associated cabin system. Thereby, the respective system menu is subordinate to the basic layout 1 and is displayed on the display area 2 when it is selected. Advantageously, the touch input keys 3 of the basic layout 1 are accessible and usable for an operator of the device regardless of the particular menu being displayed, i.e. for each display of a respective menu on the display area 2.

As can also be seen in FIG. 1, the device further includes, incorporated in the basic layout 1, an information key 5, a help key or button 6, a key or switch 7 for directly calling up the main menu regardless of the presently active state of the display area 2, and a locking switch or key 8 for switching off and/or locking the display screen. Particularly, from any screen or menu or display, the information key 5 will provide context-sensitive further information for the operator of the apparatus, while the help key 6 will provide context-sensitive operating instructions and further help for operating the apparatus. For example, if the lighting system menu 12 is being displayed, the information key 5 would provide further detailed technical information, status information and the like regarding the various lighting system components, while the help key 6 would provide instructions or guidance as to the appropriate lighting selections and how to enter the desired lighting selections in the context of the lighting system menu 12.

A scroll bar 9 is arranged above the keys 3 for the system and function symbols, whereby this scroll bar 9 shows an operator of the device that further menu sets are available. Preferably, the length of the elements of the scroll bar 9 approximately indicate the number of the subsequent menu sets. By operating the scroll bar, the successive available menu sets can be scrolled through, for example by scrolling the respective associated virtual labels or indications of the system or functional symbols indicated on the respective touch sensitive keys 3. This is achieved, for example, by touching the scrolling arrow keys at the two ends of the strip of touch sensitive input keys 3.

The menu structure represented in FIG. 2 shows the main menu 10 and several subordinate system menus 11 to 19. The main menu key 7 for calling up the main menu, the system and function symbol keys 3 and the header line 4 of the basic layout 1 will be maintained on the basic layout 1 during and regardless of the call-up and display of any selected one of the several menus in the display area 2. This is schematically indicated in that these elements are consistently shown in each one of the illustrated menus 11 to 19. The main menu 10 is conceptually arranged between the basic layout 1 and the several system menus 11 to 19, whereby any desired one of the system menus 11 to 19 can be selected and called up by an operator by manually touching the touch input keys 3 provided with the corresponding system and function symbols, or simply by touching the depiction of a corresponding system icon or symbol on the active main menu 10 being displayed on the touch sensitive general display area 2 of the basic layout 1. As an alternative, the system menus 11 to 19 can be automatically successively called up and displayed in the display area 2 of the basic layout 1, for example according to a prescribed succession plan or display sequence.

The linkages between the several system menus and the main menu are illustrated by corresponding arrows in FIG. 2. For example, from any system screen being displayed in the display area 2 of the basic layout 1, the operator can return directly to the main menu 10 by pressing the main menu key 7, also called the cabin status key 7. Similarly, from any displayed menu, the operator can directly select a different desired system menu by pressing the corresponding touch input key 3 labeled with the appropriate corresponding system symbol or label. The scroll arrow touch input keys will, for example, scroll to the next successive or the previous system menu. In any event, once the selected main menu or system menu is displayed on the display area 2 of the basic layout 1, the touch sensitive display screen becomes active with the appropriate touch sensitive input areas associated with the respective displayed menu. Thereby, the operator can select or control desired operating conditions of the respective displayed cabin system associated with the selected one of the system menus 11 to 19 by simply touching the appropriate corresponding function symbols being displayed on the associated menu on the display area 2 of the basic layout 1.

Further details of the individual menus respectively shown in FIGS. 4 to 10 will be discussed below. In the context of the following discussion, several advantages of the invention will become apparent. The invention allows a reduction of the number of individual or separate operating devices. Namely, a single operating device is provided for monitoring and controlling all of the pertinent cabin systems. This in turn leads to a weight and cost reduction, savings with regard to the costs and effort needed for installation and cable connections, and makes simplified networking of the device possible. The inventive apparatus fulfills the specifications and other requirements for the control and monitoring of aircraft cabin systems especially in the newest high capacity aircraft, for example in connection with a complex lighting control or climate control, as well as providing an open interface for server applications and software download capabilities. The inventive apparatus can be readily adapted to accommodate the requirements of various customers of the aircraft manufacturer, i.e. the various airlines purchasing the aircraft. This is especially true because essentially all of the adaptations can be achieved simply by changes of the software and/or parameters in the cabin allocation or assignment module. An adaptation of the hardware (devices or accessories) is no longer necessary. All expansions and provision of new functions can be achieved simply by updating the software and/or the parameters in the cabin allocation or assignment module. It is therefore also possible that each customer airline can carry through its own individual company identity with special functions, options, displays, logos, messages, color schemes, or the like.

Figure 3:
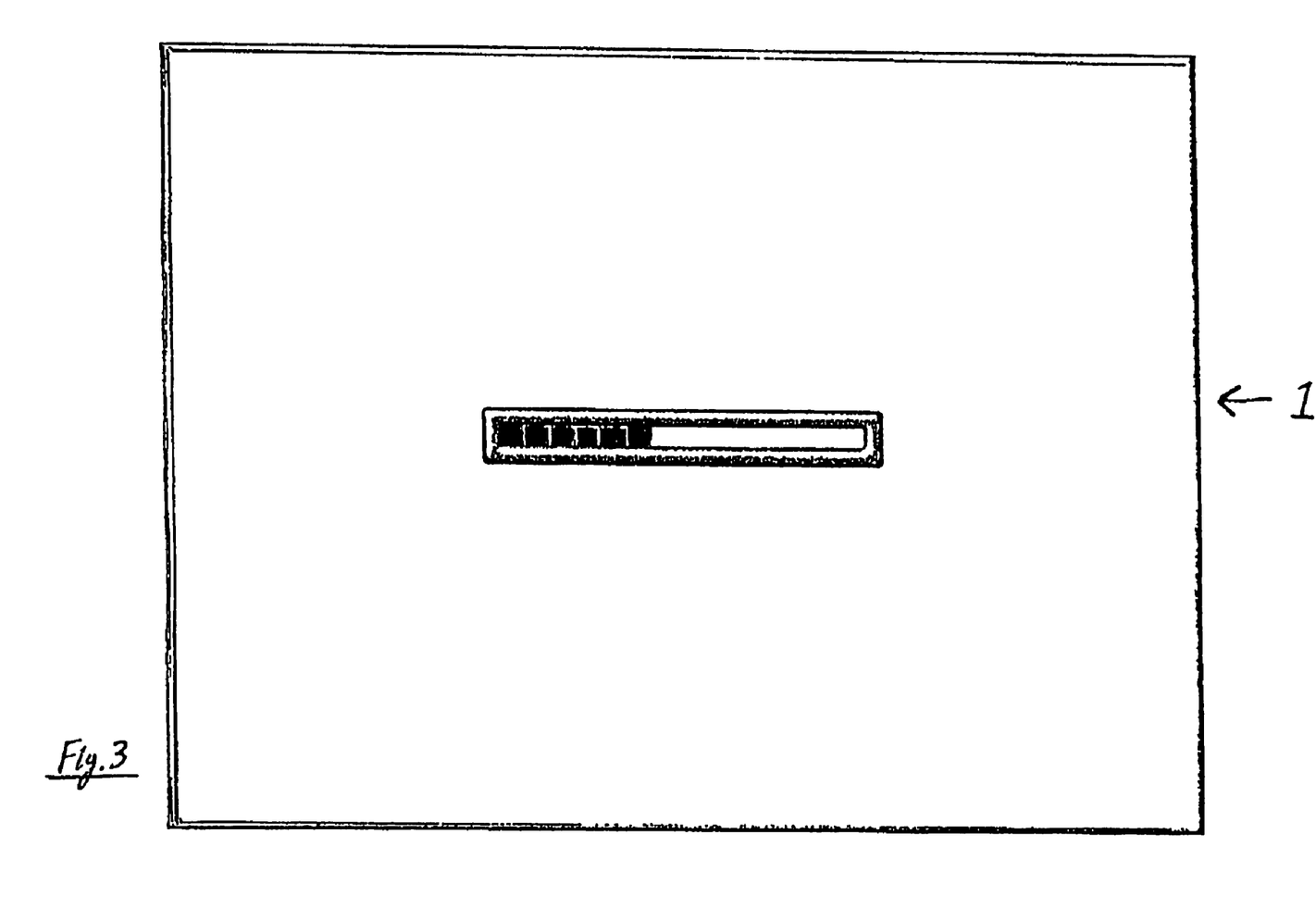
FIG. 3 schematically shows the appearance of the arrangement during a booting phase.

The simple schematic view of FIG. 3 represents the appearance of the overall apparatus or device during booting up of the overall system software, as shown with a so-called progress bar showing the progress of the boot-up procedure, for example. Note that the liquid crystal display screen is otherwise blank or empty. This demonstrates the preferred embodiment in which the entire user interface is embodied as a versatile, adaptable touch sensitive display screen, on which all of the touch input keys, display areas and the like are virtually generated and displayed as necessary for the particular situation. None of the input keys needs to be a permanent hard-wired element. After completion of the boot-up process, preferably the main menu 10 shown in FIG. 4 will be displayed on the general display area 2 of the basic layout 1.

Figure 4:
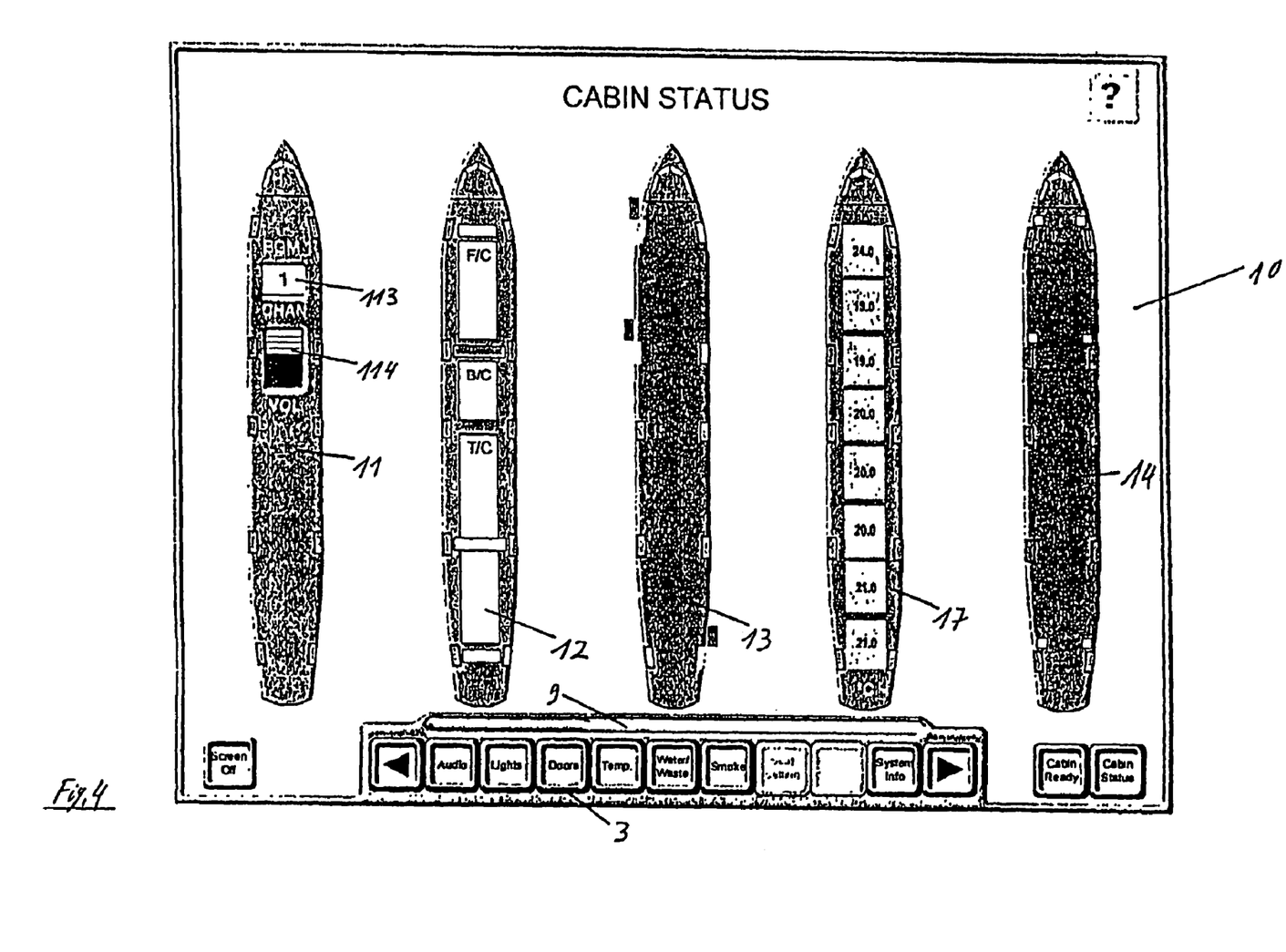
FIG. 4 schematically shows the main menu with five graphically displayed examples of subordinate cabin systems that can be selected.

As shown in FIG. 4, the main menu 10 provides a general overview of the overall cabin status and includes the essential information or data regarding the various cabin systems to allow the desired pertinent cabin system to be selected. For example, the main menu 10 shows the cabin status of five different cabin systems relating to the system menus 11 to 15, namely for the cabin audio system 11, the cabin lighting system 12, the aircraft doors 13, the water supply and wastewater system 14, and the temperature or air-conditioning system 17. These several systems are respectively displayed with a corresponding graphical display of the relevant aspects of the cabin layout on the display area 2, and from there the respective corresponding system menus can be directly selected and called-up by means of the touch sensitive screen technology, namely by simply touching the area of the display screen 2 on which the selected system image is displayed.

Figure 5:
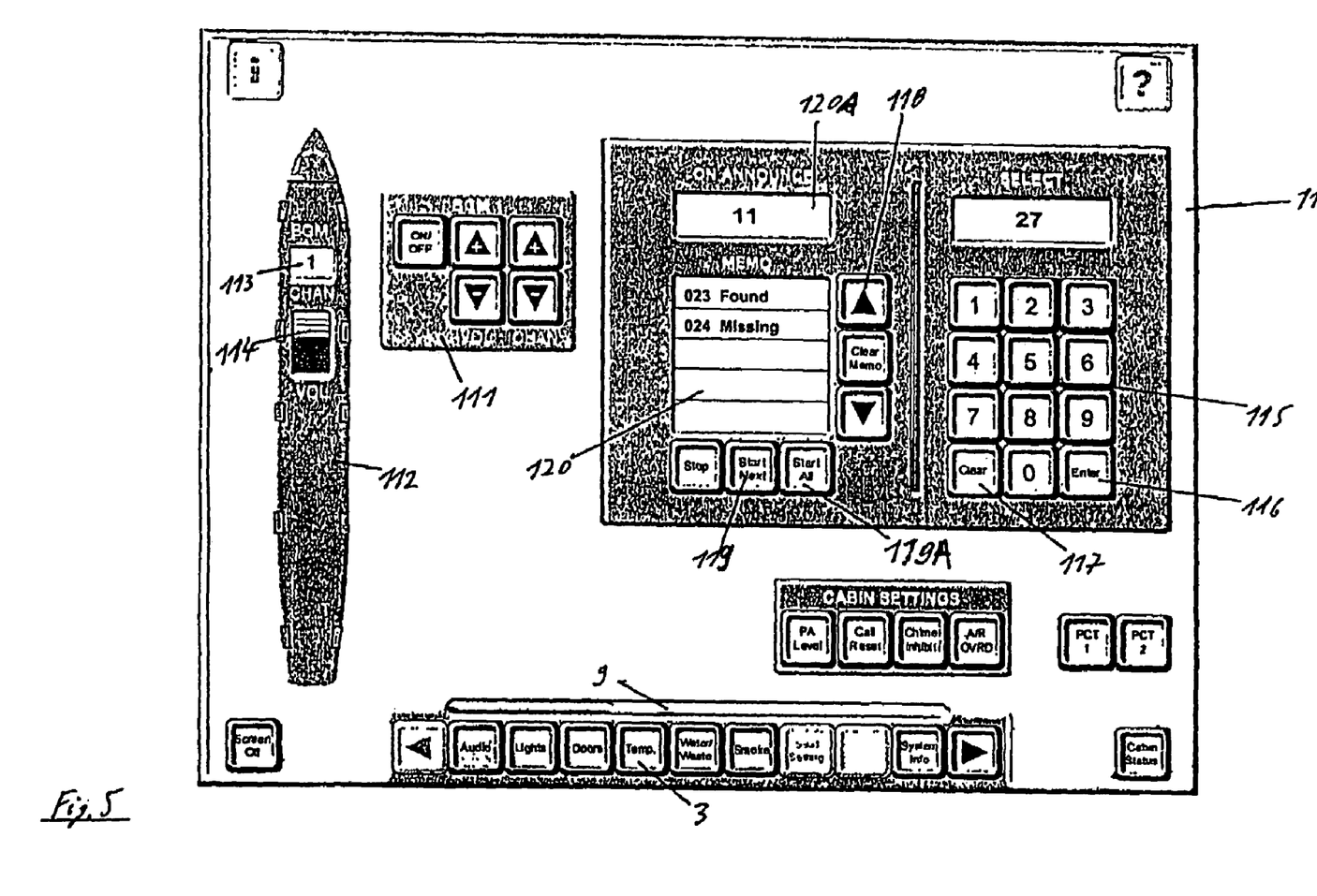
FIG. 5 schematically shows a system menu associated with an audio system of the aircraft.

The system menu 11 shown in FIG. 5 is for controlling and monitoring the aircraft cabin audio system, namely with respect to selecting and playing previously recorded announcements as well as adjusting or selecting the on-board music channel. In this context, selection of the music channel and the volume is carried out by means of the respective corresponding ± keys 111 in a virtual keyboard grouping on the left side of the system menu 11. The currently existing status of these adjustments, i.e. the actually selected music channel and volume, is respectively indicated in corresponding display fields, namely a channel indicator 113 and a volume indicator 114 within a graphical aircraft symbol 112.

On the other hand, passenger information and instruction announcements can be selected in a virtual display and keypad screen on the right side of the system menu 11, for example through selection or input of the corresponding associated number of the announcement via the numerical key pad 115. Then, by pressing the enter key 116, the presently entered announcement number may be confirmed and selected, while on the other hand the clear key 117 may be touched in order to erase or clear the entered number. The arrow keys 118 can be used to scroll through the available recorded announcements in order to find one or more desired announcements in a targeted manner, to be queued in a view window or memo window 120. The start key 119 can then be used to play the next selected announcement, while the clear key 117 can be used to clear the preselection. The "start-all" key 119A can be touched to begin a sequential playing of all of the selected or stored announcements, while the list or sequence of stored announcements to be played is indicated in the memo window 120, and the number of the currently playing announcement is displayed in the indicator field 120A above the memo window 120. In order to interrupt the playing of the announcement or announcements, a stop key is also provided.

Additional functions pertinent to the audio system can also be displayed and selected via virtual displays and keys, for example to adjust the PA level, to reset the call buttons, to inhibit call chimes, or the like. This is merely an example demonstration of various different functions and features that can be displayed and selected based on the needs of the individual application, simply by appropriate program adjustments.

Figure 6:
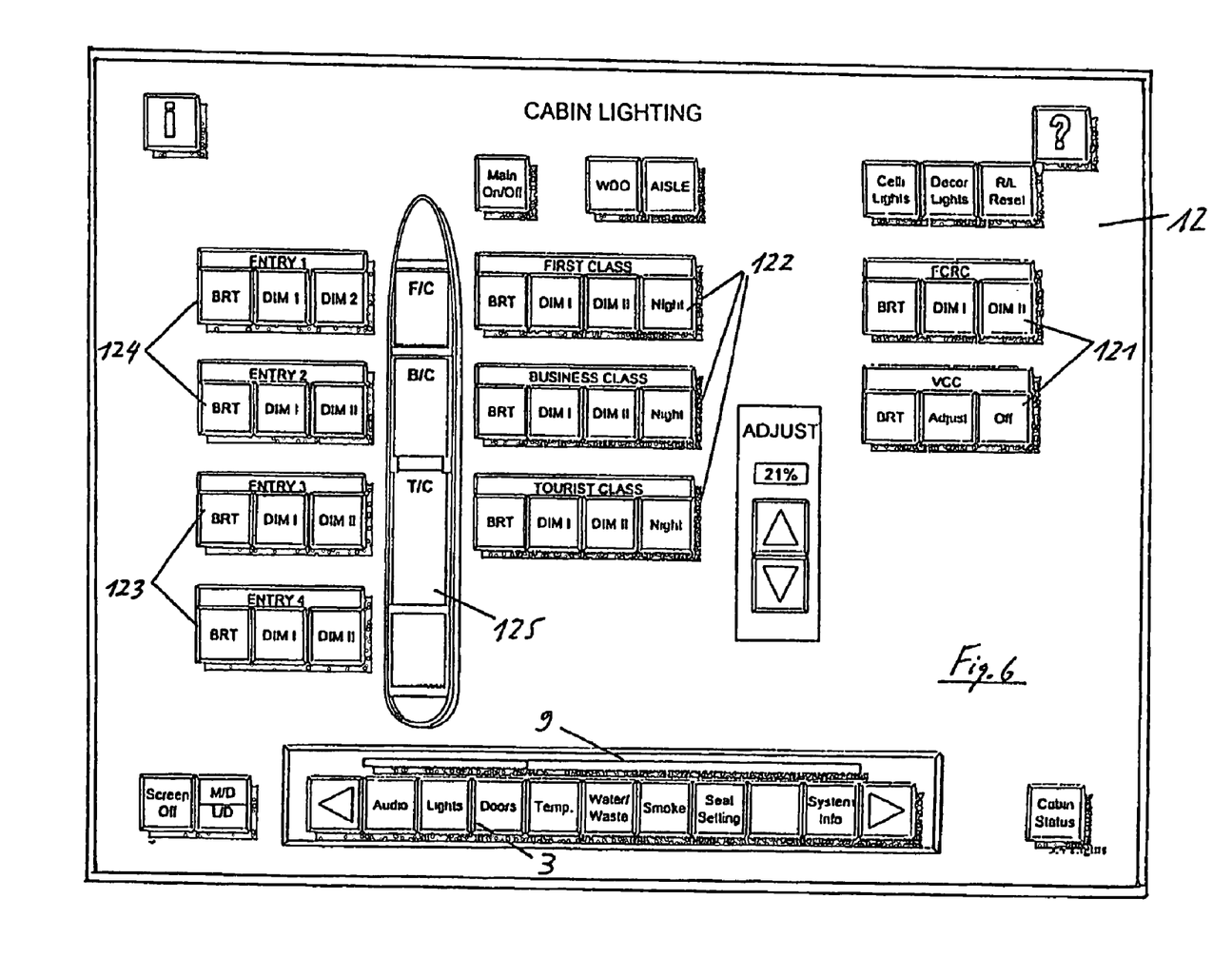
FIG. 6 schematically shows a system menu associated with a lighting system of the aircraft.

The system menu 12 shown in FIG. 6 controls the cabin lighting system in the aircraft cabin. For example, this cabin lighting system can include separate lighting arrangements for the door entry zones, separate cabin zones, and/or individual independent partitioned areas, spaces or cabins within the aircraft, which may all be individually controlled and monitored from the system menu 12. In this regard, the system menu 12 includes several sets or groups of touch input keys 121, 122, 123 and 124, which each allow selection or adjustment of the desired lighting brightness level in respective different cabin areas. Preferably, in the cabin entry zones, any desired one of three brightness steps, namely bright or full illumination, dimming stage 1, and dimming stage 2 can be selected. The current, actually selected lighting adjustments are displayed in a graphical aircraft symbol 125, which is advantageously divided into the various lighting zones. Various other display features and/or input keys can be provided on the screen display of this system menu 12, as needed for any particular application. For example, a fine-tuned brightness or dimness adjustment is possible by selecting a particular percentage of the maximum full brightness with corresponding arrow scroll keys. The functions of the other exemplary keys shown in FIG. 6 are self-explanatory in the context of aircraft cabin lighting systems.

Figure 7:
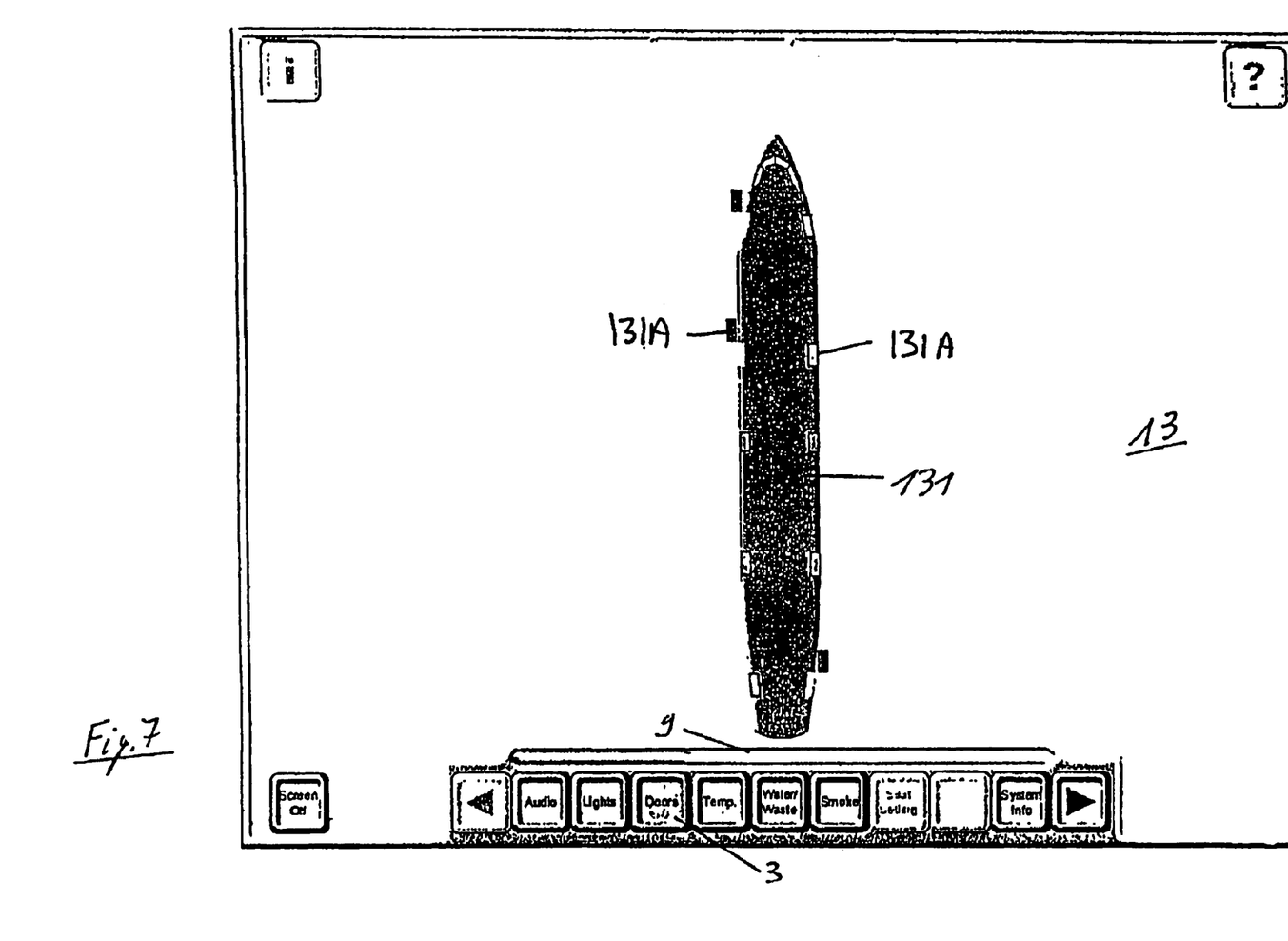
FIG. 7 schematically shows a system menu associated with all aircraft doors of the aircraft.

FIG. 7 shows a system menu 13, which shows the actual present status of all cabin doors and hatches. For example, a graphical aircraft symbol 131 includes a clearly visible graphical indication 131A of each door, emergency exit hatch, emergency slide, and the like, as well as the respective status thereof. For example, the display or status indication can provide information whether each respective door or hatch is closed or open, pressure-tight or not pressure-tight, locked or unlocked, etc.

Figure 8:
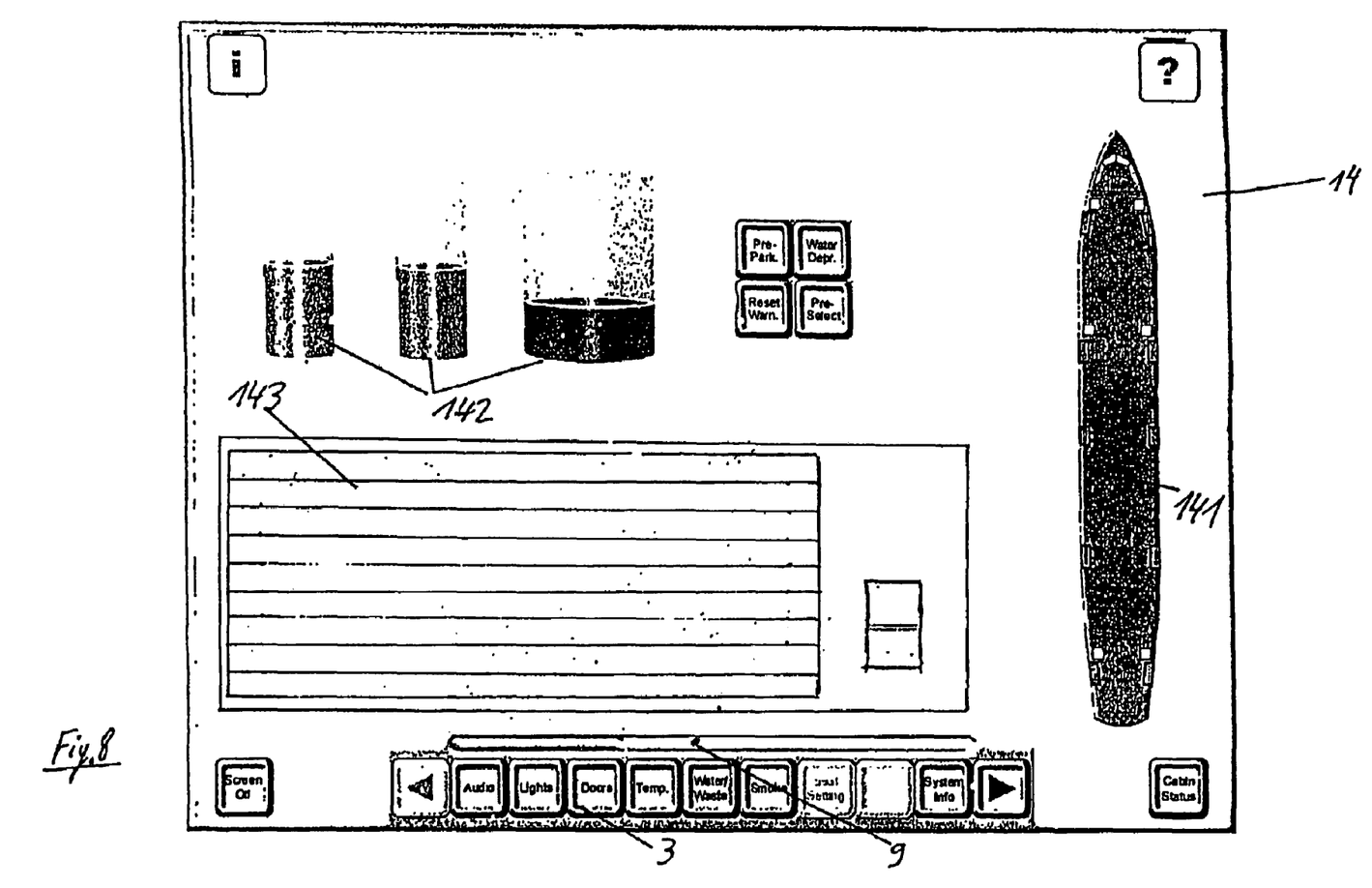
FIG. 8 schematically shows a system menu associated with the water supply and wastewater system of the aircraft.

The system menu 14 shown in FIG. 8 is associated with the water supply and wastewater systems of the aircraft. The system menu 14 includes, on the right side, a graphical aircraft symbol 141, in which the location of each galley and each restroom or toilet is indicated. It is also indicated whether the galley or restroom is properly functional and active, or inactive due to a malfunction or error. In the upper part of the menu 14, graphical images of supply water and wastewater tanks 142 also show the current actual existing water level or volume of water in each tank. Arrows or other indicators can mark prescribed volume values or warning levels or the like. Furthermore, a display screen 143 allows the current actual existing status values of the above mentioned components to be displayed. Input and selection keys can also be provided to allow an operator to control these components.

Figure 9:
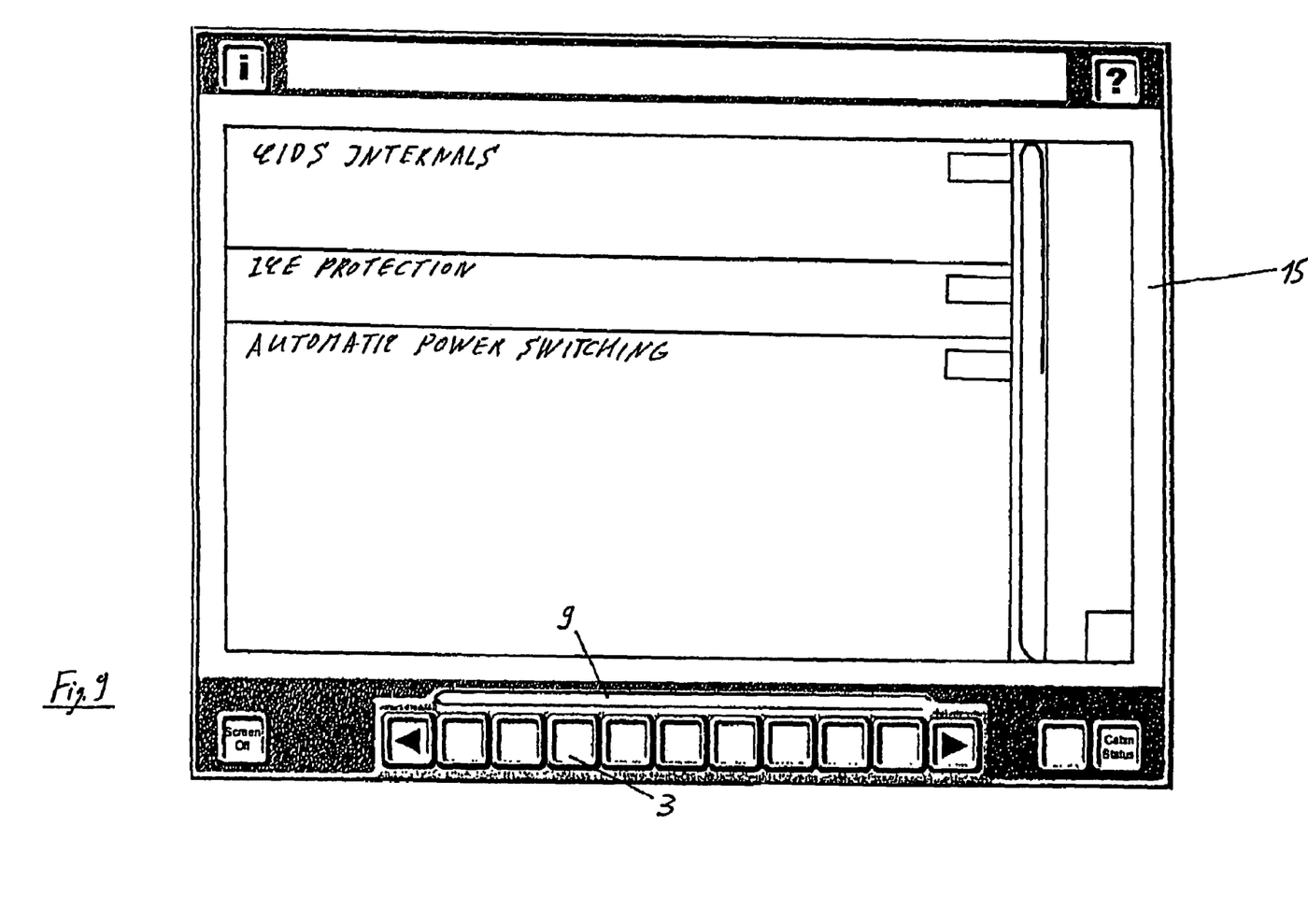
FIG. 9 schematically shows a system menu for indicating the status of all of the cabin systems.

Accordingly to FIG. 9, the inventive apparatus further provides a system menu 15, which displays status values of various cabin systems, and which is preferably called-up before take-off of any flight. An automatic call-up and display of this menu 15 is also advantageous during any flight phase, if the flight crew of the aircraft requires information or status data regarding any of the individual systems. For example, the display can include display fields for status information regarding the cabin intercommunication data system (CIDS), the ice or freeze protection devices, or the electric power supply system. By touching a selection key associated with each respective display field, the operator can then obtain detailed status information regarding the particular selected system.

Figure 10:
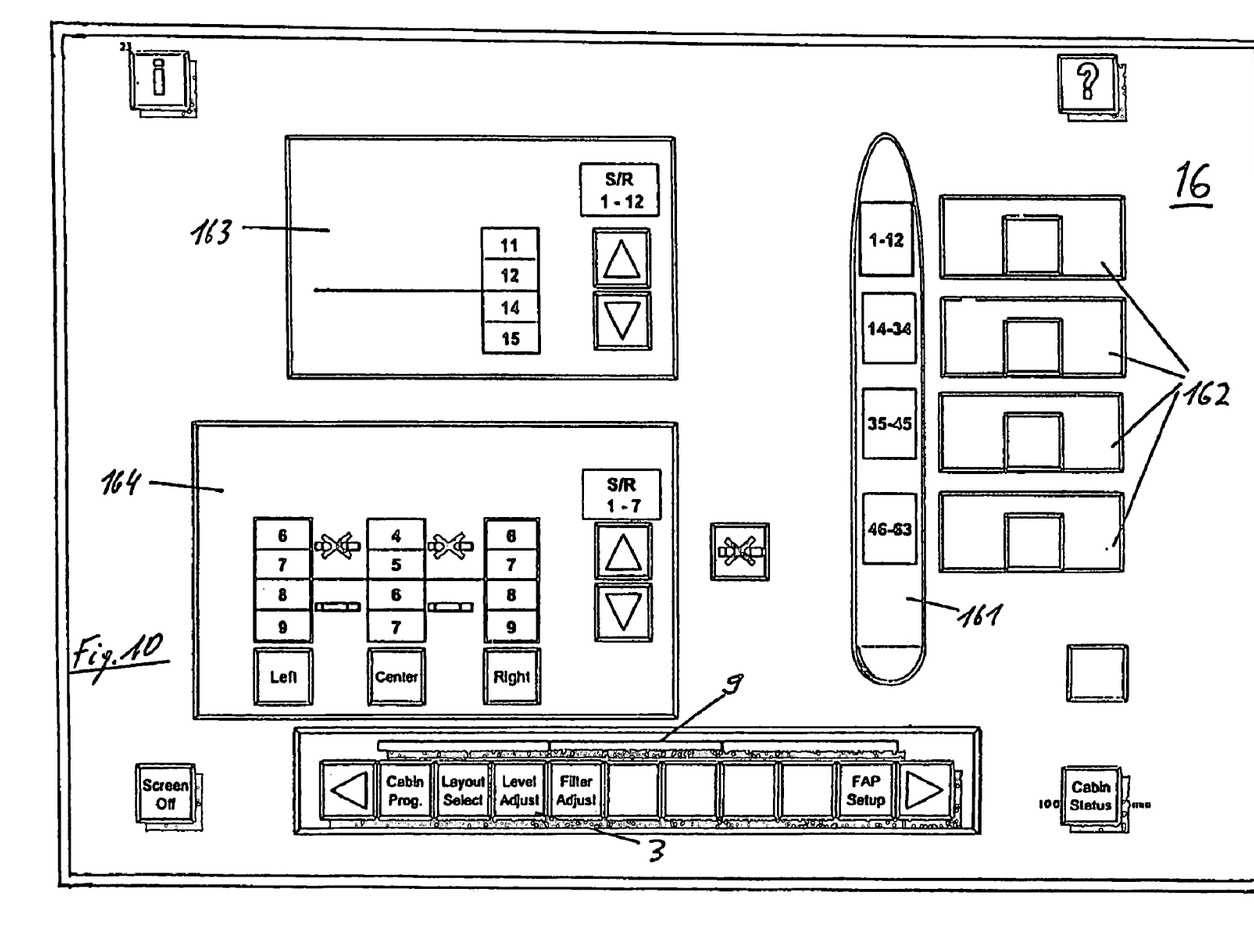
FIG. 10 schematically shows a system menu for programming various functions of the cabin systems.

The system menu 16 shown in FIG. 10 is provided to allow programming of the cabin systems, for example with regard to various parameters in different cabin zones. In the illustrated example, a graphical aircraft symbol 161 shows the several cabin zones, for example in respective seat row ranges or areas, and various touch input key fields 162, 163 and 164 for inputting programming commands for the associated functions in relation to the respective cabin zones or areas. For example, the display and input key field 164 allows a programming of the cabin areas in which smoking will be allowed and those cabin areas in which smoking will not be allowed, e.g. by illuminating the corresponding appropriate smoking or non-smoking indicators in the respective associated cabin areas.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims

What is claimed is:

1. A user interface for monitoring and controlling a plurality of aircraft cabin systems comprising:
    a liquid crystal display screen having a display surface configured to provide an input to said user interface when touched by a user of the user interface;
    a general display area provided on the display surface and displaying a main menu that includes a subset of the plurality of aircraft cabin systems, selected by the user from among the plurality of aircraft cabin systems, which includes a first system image showing status information for a first system of the plurality of aircraft cabin systems, and a second system image showing status information for a second system of the plurality of aircraft cabin systems, wherein at least the first system image is a spatial map of the aircraft cabin showing status information for the first system at different locations within the aircraft cabin;
    a plurality of touch sensitive input keys arranged on a scroll bar and provided on the display surface, each key labeled with a symbol identifying a respective one of said plurality of aircraft cabin systems including the first and second aircraft cabin systems;
    a first system menu associated with the first system of said plurality of aircraft cabin systems, the first system menu being displayable on said display screen as a first system graphical menu when the touch sensitive key identifying the first system is activated by the user and when the first system image spatial map is touched by the user and also when a predescribed succession plan or display sequence automatically successively displays system graphical menus corresponding to the plurality of aircraft cabin systems;
    said first system graphical menu including status information and operating functions of said first systems and at least one input area configured to provide at least one of selection and control of said operating functions of said first system when touched by said user; and
    a second system menu associated with the second system of said plurality of aircraft cabin systems, the second system menu being displayable on said display screen as a second system graphical menu when the touch sensitive key identifying the second system is activated by the user and when the second system image is touched by the user and also when the predescribed succession plan or display sequence automatically successively displays system graphical menus corresponding to the plurality of aircraft cabin systems, said second system graphical menu including status information and operating functions of said second system and at least one input area configured to provide at least one of selection and control of said operating functions of said second system when touched by said user.

2. The user interface of claim 1, wherein said plurality of aircraft cabin systems comprise at least two of: a cabin information system, a cabin audio system, a cabin video system, a cabin lighting system, a cabin air conditioning system, a cabin smoke detector system, an aircraft door monitoring system, and a water supply and wastewater system.

3. The user interface of claim 1, wherein said main menu is a status menu including three or more system images each showing status information for a respective one of said cabin systems.

4. The user interface of claim 1, further comprising a programming menu displayed on said display screen, whereby said programming menu includes display indicators and input buttons to allow the user to program functions of each of said plurality of cabin systems.

5. The user interface of claim 1, further comprising a header line displayed on said display screen and configured to display an identification of a respective active one of said graphical menus that is being displayed on said display screen.

6. The user interface of claim 1, further comprising a main menu touch sensitive input key displayed on said display screen, wherein said plurality of touch sensitive input keys and said main menu touch sensitive input key are simultaneously displayed on said display screen when each of the first and second system menus is displayed on the display screen.

7. A system for monitoring and controlling a plurality of aircraft cabin systems, comprising:
  a liquid crystal display screen having a display surface configured to provide an input to said system when touched by a user of the user interface;
  a general display area provided on the display surface and displaying a main menu that includes a subset of the plurality of aircraft cabin systems, selected by the user from among the plurality of aircraft cabin systems, which includes a first system image showing status information for a first system of the plurality of aircraft cabin systems, and a second system image showing status information for a second system of the plurality of aircraft cabin systems, wherein at least the first system image is a spatial map of the aircraft cabin showing status information for the first system at different locations within the aircraft cabin;
  a plurality of touch sensitive input keys arranged on a scroll bar and provided on the display surface, each key labeled with a symbol identifying a respective one of said plurality of aircraft cabin systems including the first and second aircraft cabin systems;
  a computer including software to be executed on the computer, wherein the computer is configured to:
  display on said display screen a first system graphical menu associated with the first system of said plurality of aircraft cabin systems when the touch sensitive key identifying the first system is activated by the user and when the first system image spatial map is touched by the user and also when a predescribed succession plan or display sequence automatically successively displays system graphical menus corresponding to the plurality of aircraft cabin systems, said first system graphical menu including status information and operating functions of said first system and at least one input area,
  provide at least one of selection and control of said operating functions of said first system when the input area of the first system graphical menu is touched by said user,
  display on said display screen a second system graphical menu associated with the second system of said plurality of aircraft cabin systems when the touch sensitive key identifying the second system is activated by the user and when the second system image is touched by the user and also when the predescribed succession plan or display sequence automatically successively displays system graphical menus corresponding to the plurality of aircraft cabin systems, said second system graphical menu including status information and operating functions of said second system and at least one input area, and
  provide at least one selection and control of said operating functions of said second system when the input are of the second system graphical menu is touched by said user.

8. The system of claim 7, wherein said plurality of aircraft cabin systems comprise at least two of: a cabin information system, a cabin audio system, a cabin video system, a cabin lighting system, a cabin air conditioning system, a cabin smoke detector system, an aircraft door monitoring system, and a water supply and wastewater system.

9. The system of claim 7, wherein said computer is configured to display said menu as a status menu on said display screen when a status menu request is input to an area of said display screen surface, said status menu including three or more system images each showing status information for a respective one of said cabin systems.

10. The system of claim 7, wherein said computer is configured to display a programming menu on said display screen when a programming menu request is input to an area of said display screen surface, said programming menu including display indicators and input areas to allow the user to program functions of each of said plurality of said cabin systems.

11. The system of claim 7, wherein said computer is configured to display a header line on said display screen, which identifies a respective active one of said menus that is being displayed on said display screen.

12. A system for monitoring and controlling a plurality of aircraft cabin systems, comprising:
  means for displaying simultaneously a main menu including a subset of the plurality of aircraft cabin systems, selected by the user from among the plurality of aircraft cabin systems, which includes a first system image showing status information for a first system of the plurality of aircraft cabin systems, a second system image showing status information for a second system of the said plurality of aircraft cabin systems, and a plurality of input keys arranged on a scroll bar and each labeled with a symbol identifying a respective one of said plurality of aircraft cabin systems, wherein at least the first system image is a spatial map of the aircraft cabin showing status information for the first system at different locations within the aircraft cabin;
  means for causing said means for displaying to display a first system graphical menu associated with a first system of said plurality of aircraft cabin systems in response to a user touching the first system image spatial map and in response to the user touching the input key identifying the first system and also in response to a predescribed succession plan or display sequence which automatically successively displays systems graphical menus corresponding to the plurality of aircraft cabin systems, said first system graphical menu including status information and operating functions of said first system and at least one input area providing at least one of selection and control of said operating functions of said first system when the input area of the first system graphical menu is touched by said user; and means for causing said means for displaying to display a second system graphical menu associated with a second system of said plurality of aircraft cabin systems in response to a user touching the second system image and in response to the user touching the input key identifying the second system and also in response to a predescribed succession plan or display sequence which automatically successively displays systems graphical menus corresponding to the plurality of aircraft cabin systems, said second system graphical menu including status information and operating functions of said second system and at least one input area providing at least one of selection and control of said operating functions of said second system when the input area of the second system graphical menu is touched by said user.

13. The system of claim 12, wherein said plurality of aircraft cabin systems comprise at least two of: a cabin information system, a cabin audio system, a cabin video system, a cabin lighting system, a cabin air conditioning system, a cabin smoke detector system, an aircraft door monitoring system, and a water supply and wastewater system.

14. The system of claim 12, further comprising means for causing said means for displaying to display a status menu when a status menu request is input to said system said status menu displaying three or more system images each showing status information for a respective one of said cabin systems.

15. The system of claim 12, further comprising means for causing said means for displaying to display a programming menu when a programming menu request is input to said system, said programming menu including display indicators and input areas to allow the user to program functions of each of said plurality of cabin systems.

16. The system of claim 12, further comprising means for causing said means for displaying to display a header line that identifies a respective active one of said graphical menus that is being displayed on said means for displaying.

17. A computer readable medium containing program instructions for execution on a computer controlled system for monitoring and controlling a plurality of aircraft cabin systems, which when executed by the system, cause the system to perform the following:

display a main menu simultaneously including a subset of the plurality of aircraft cabin systems, selected by the user from among the plurality of aircraft cabin systems, which includes a first system image showing status information for a first system of the plurality of aircraft cabin systems, and a second system image showing status information for a second system of the plurality of aircraft cabin systems, wherein at least the first system image is a spatial map of the aircraft cabin showing status information for the within the aircraft cabin;

display a first system graphical menu associated with a first system of said plurality of aircraft cabin systems in response to user input to a touch sensitive key arranged on a scroll bar and identifying the first system and in response to the user touching the first system image spatial map and also in response to a predescribed succession plan or display sequence which automatically successively displays system graphical menus corresponding to the plurality of aircraft cabin systems, said first system graphical menu including status information and operating functions of said first system, and at least one touch sensitive input area;

perform at least one of selection and control of said operating functions of said first system in response to user activation of said touch sensitive area of the first system graphical menu;

display a second system graphical menu associated with a second system of said plurality of aircraft cabin systems in response to user input to a touch sensitive key arranged on the scroll bar and identifying the second system and in response to the user touching the second system image and also in response to a predescribed succession plan or display sequence which automatically successively displays system graphical menus corresponding to the plurality of aircraft cabin systems, said second system, graphical menu including status information and operating functions of said second system and at least one touch sensitive input area; and perform at least one of selection and control of said operating functions of said second system in response to user activation of said touch sensitive area of the second system graphical menu.

18. The computer readable medium of claim 17, wherein said program instructions further cause the system to display a header line on the display, said header line displaying an identification of a respective active one of said graphical menus that is being displayed.

19. The computer readable medium of claim 17, wherein said program instructions further cause the system to display a status menu on said display in response to a user input to the system, said status menu displaying three or more system images each showing status information relating to a respective one of said cabin systems.

20. The computer readable medium of claim 17, wherein said program instructions further cause the system to display a programming menu on said display screen in response to a user input to said system, whereby said programming menu includes display indicators and input buttons to allow the user to program functions of said plurality of cabin systems.

21. The user interface of claim 1, wherein the entire user interface is embodied as an adaptable touch sensitive screen without any hard wired input keys.

22. The user interface of claim 1, wherein:

the second system image is another spatial map of the aircraft cabin showing status information for the second system at different locations within the aircraft cabin, and the second system menu being displayable on said display screen as a second system graphical menu when the touch sensitive key identifying the second system is activated by the user and when the second system image another spatial map is touched by there user.

* * * * *

UNITED STATES PATENT AND TRADEMARK OFFICE
CERTIFICATE OF CORRECTION

| | |
|---|---|
| PATENT NO. | : 7,509,587 B2 |
| APPLICATION NO. | : 10/713223 |
| DATED | : March 24, 2009 |
| INVENTOR(S) | : Kirsten Kopitzke et al. |

Page 1 of 1

It is certified that error appears in the above-identified patent and that said Letters Patent is hereby corrected as shown below:

Column 10, line 30, claim 9 insert --main-- after "said."

Column 11, line 61, claim 17 insert --first system at different location-- after "the."

Column 11, line 62, claim 17 delete "a" after "menu associated with" and insert --the--.

Signed and Sealed this

Eighth Day of September, 2009

David J. Kappos
*Director of the United States Patent and Trademark Office*